Sept. 13, 1960          B. A. BANG          2,952,188
LIGHT FILTER FOR TELEVISION PICKUP TUBES AND THE LIKE
Filed March 14, 1958
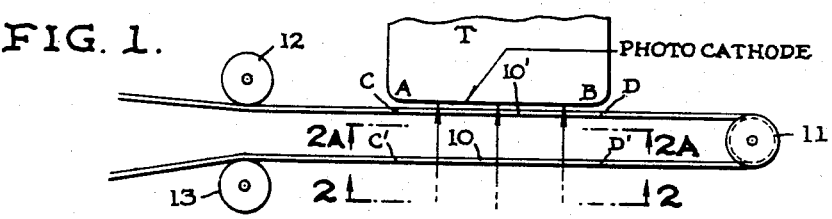
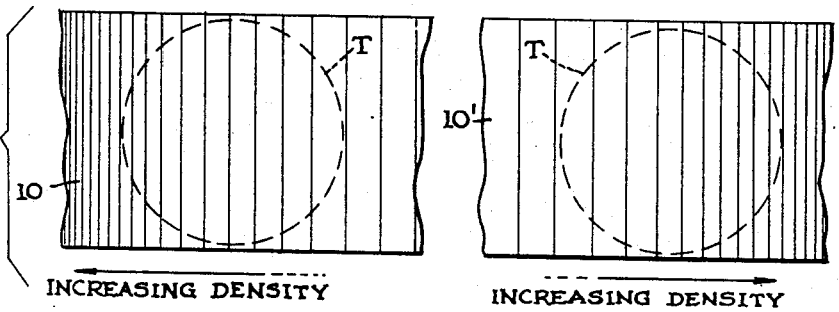
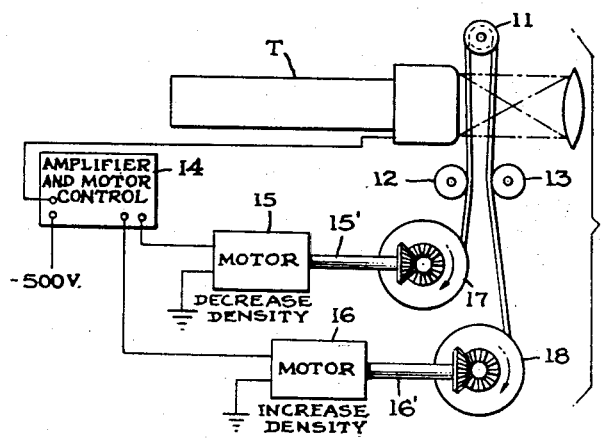
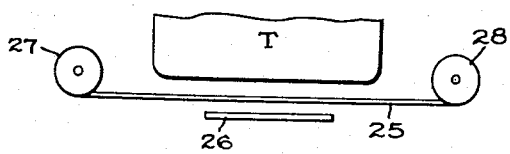
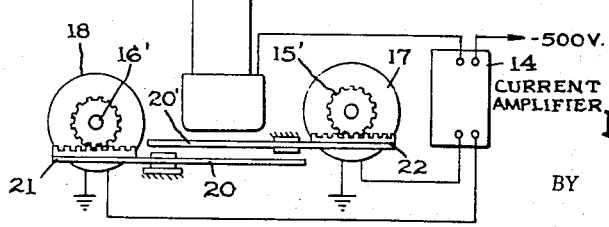
INVENTOR
BERNHARD A. BANG
BY K. G. Doub
ATTORNEY

United States Patent Office 2,952,188
Patented Sept. 13, 1960

2,952,188
LIGHT FILTER FOR TELEVISION PICKUP TUBES AND THE LIKE

Bernhard A. Bang, Baltimore, Md., assignor to The Bendix Corporation, a corporation of Delaware Filed Mar. 14, 1958, Ser. No. 721,423

1 Claim. (Cl. 88—61)

This invention relates to light filters for regulating the intensity of available light admitted to a light-sensitive surface, such as the photographic film of a camera or the photo-cathode of a television pickup tube.

Light regulating or compensating filters are not new; many different versions have been proposed in the past and certain of these have been used commercially. One example comprises a thin strip or film of light-filtering material, trained at opposite extremities over rollers or pulleys and interposed between the optical lens system of a television pickup tube and the photocathode or target, the rollers or pulleys being driven by an electric motor energized as a function of the television input signal. An objection to this type of filter as well as other prior known types is that since the single strip of film varies in density along its effective length, the filtering area of that portion of the film which at any given time spans the light path varies in a similar manner. Hence the intensity of the light admitted to the photocathode will be non-uniform, i.e. it will be of uneven intensity, with the result that the contrast and resolution of the resultant picture suffers. Another objection to such type of filter is that it requires a relatively long length or strip of filtering material and a proportional degree or amount of filter travel to cover the desired filtering range, which may encompass a considerable variation in light level, as where an outlying unattended television camera is adapted to scan an area and transmit the picture signal to a central station or kinescope whenever called upon throughout the day and night; and since the filter strip drive mechanism is conveniently powered by means operating as a function of the video signal, it is highly desirable to hold power consumption to a minimum.

The primary object of the present invention therefore is to provide a filter for automatically compensating for changes in the intensity of light admitted to a light-sensitive surface wherein the light-transmissibility or light-attenuation factor of the filter will be uniform across its entire effective area. The term "effective area" as used herein means that portion of the film which at any given time spans the path of light to which the light-sensitive surface may be exposed.

Another object is to provide a light filter utilizing a strip of neutral density filter material in a manner such that it will produce uniform filtering across a light-sensitive surface and at the same time require only a relatively short length of such material as well as a relatively short stroke or amount of filter travel to cover the desired range of filtering action. By "neutral density" is meant filter material in which all wave lengths of light are absorbed substantially uniformly.

Another object is to provide a filter for the purpose specified adapted to use to its best advantage a film or strip of light-filtering material in which the density of the film varies linearly and in proportion to distance along the length thereof.

Another object is to generally improve light-filtering mechanism of the type specified.

The foregoing and other objects and advantages will become apparent in view of the following description taken in conjunction with the drawings, wherein:

Fig. 1 is a view in edge elevation of a filter in accordance with the invention mounted in operative relation to the photocathode end of a television pickup tube;

Figs. 2 and 2A are views in elevation taken on the lines 2—2 and 2A—2A, Fig. 1;

Fig. 3 is a generally schematic view, illustrating a type of drive system which may be used for the filter of Figs. 1 and 2;

Fig. 4 is a view similar to Fig. 3, showing a modified filter arrangement; and

Fig. 5 is a view similar to Fig. 1 of a further modification.

Referring to Figs. 1, 2, 2A and 3, a television pickup tube is indicated at T; it has the usual photocathode or like photo-sensitive element installed in the face thereof, and the function of the improved filter is to control the intensity of light admitted thereto in a manner such as to maintain the tube at its most efficient point of operation. The filter per se comprises a strip of film having sections 10 and 10', treated to obtain the characteristics of (a) neutral density and (b) density variation linearly and uniformly along and in proportion to the effective length of each section and in one direction in one section and in the opposite direction in the other section. In Figs. 2 and 2A an attempt has been made to illustrate (b) by shading. The strip is doubled back upon itself, and in Figs. 1 and 3 this is done by training it over a supporting roller 11 located at one side of the tube T and between spaced guide rolls 12 and 13 at the opposite side of the said tube. In this manner, the sections 10, 10' of the film strip are guided in properly spaced overlapping relation across the light path. Although the film strip is made up of a continuous length in the form shown in Figs. 1, 2 and 3 to provide the two overlapped, longitudinally-movable lengths or sections 10, 10', other means may be adopted to arrive at the end result as will be apparent upon reference to Figs. 4 and 5.

Fig. 3 illustrates a type of drive mechanism for the filter strip of Fig. 1. Since the photocathode current varies in direct relation to variation in the light falling on the photocathode surface, this current may be conveniently used as a source of power for the driving mechanism. A current amplifier 14 serves to raise the photocathode current to the required value to drive two motors 15 and 16. The one end of the film strip is attached to a roller 17 having a driving connection with the output shaft 15' of motor 15, while the other end of the strip is secured to a roller 18 having a driving connection with the output shaft 16' of motor 16.

Operation

As heretofore noted, the purpose of the filter is to maintain the intensity of the light admitted to the photocathode of the pickup tube T at its most efficient operating point. For most purposes, this requirement can be met by holding the intensity of the light within a given range of variation, see for example Fig. 5 of the co-pending application of Bernhard A. Bang et al., Serial Number 721,422, filed March 14, 1958. Should the intensity increase or decrease above or below this range, the variation in photocathode current will energize either the motor 15 or 16, depending upon the direction of variation, and so locate the overlapped sections 10, 10' as to return the light to the proper level.

It can be proved mathematically that when a filter strip whose density varies uniformly along its length is doubled back upon itself to position oppositely-densed sections across a light path (or coacting strips in which the density varies uniformly in opposite directions are overlapped as exemplified in Figs. 4 and 5) a filter system results in which the light transmissibility or attenuation factor is uniform throughout the entire effective area of the filter.

By definition:

$$\text{Density } (D) = \text{Log} \frac{1}{\text{Transmission } (T)}$$

If two neutral density filters are located in overlapped adjacency across a light path, the net transmission ($T_n$) of the pair is the transmission (expressed as a fraction of total incident light) of the first times that of the second: $T_n = T_1 T_2$.

Also: Log $T_n$ = Log $T_1$ + Log $T_2$; and by the same token:

$$\text{Log} \frac{1}{T_n} = \text{Log} \frac{1}{T_1} + \text{Log} \frac{1}{T_2}$$

But by definition:

$$D = \text{Log} \frac{1}{T}$$

Thus the net density equals the density of one filter plus the density of the other, the densities of the two filters being directly additive.

In Fig. 1 the doubled-back or overlapped sections of the film strip between points C, $C_1$ and D, $D_1$ constitute the effective filtering area spanning the photocathode surface between points A and B. Considering this area in the light of the foregoing analysis, the net transmission at A equals the transmission at C times the transmission at D, or the net density at A equals the density of C plus the density of $C_1$, and the net density at B equals the density of D plus the density of $D_1$.

As heretofore noted, the density of the film strip varies linearly along the length thereof, and along the overlapped sections 10 and 10' this variation is in opposite directions. Hence the density of C minus the density of D equals the density of $D_1$ minus the density of $C_1$.

Transposing:

The density of C plus the density of $C_1$ equals the density of D plus the density of $D_1$, and hence the density at A equals the density at B.

If it be assumed that the pickup tube is located outdoors where it is exposed to bright sunlight, the filter strips 10, 10' will have been positioned for maximum density or minimum light admissibility to maintain the tube within the "best" range of illumination. As the light fades towards the end of the day, the drive system will shift the overlapped sections 10, 10' to positions of gradually decreasing density, or progressively increasing light admissibility, to compensate for a change in exterior light intensity; and at all times the light rays admitted to the photocathode will be substantially uniform across its entire face. Thus not only will the picture tube operate within the best range of illumination, but the resolution of the resulting kinescope picture will be uniform across its entire viewing area. Furthermore, since the sections 10, 10' coact to produce the filtering action, the required forward or reverse degree of rotation of the drive roller will be less than what would be required if a single strip only of filter material were used.

*Figs. 4 and 5*

In the modification of Fig. 4, the principle of light filtration is the same as in Figs. 1, 2 and 3. However, in this instance the structural characteristics are different in that the filter strips are in the form of relatively rigid plates 20 and 20' which are arranged in overlapping relation across the light path and at their outer ends are connected to gear racks 21 and 22 in mesh with drive gear motors secured on the shafts 15' and 16' of the motors 15 and 16, which are not visible in Fig. 4 but could be generally similar to those in Fig. 3. As in the case of Figs. 1, 2, 2A and 3, the density of one plate progressively increases uniformly from one end to the other and the density of its coacting plate similarly increases in the opposite direction. It is preferable in the arrangement shown in Fig. 4 that the drive motors be interconnected in a manner such that when one motor drives in one direction the other motor will drive in the opposite direction, so that the plates are shifted simultaneously the same distance in opposite directions when a change in light intensity occurs. Obviously, instead of using two motors, the drive could be from one motor with suitable reversing connections between the drive racks to obtain the same movement.

The modification in Fig. 5 also retains the same principle of light filtration as in Figs. 1, 2, 2A and 3. However in this instance a single strip of filter material 25 is utilized in conjunction with a relatively rigid filter plate 26, the strip 25 being trained over rollers 27 and 28 at its opposite ends, which may be driven in any suitable manner as by the motors 15 and 16 of Fig. 3. The film strip 25 is of uniform gradually decreasing density along its length in one direction while the plate 26 is of uniform gradually decreasing density in the opposite direction. In view of what has been stated in connection with the operation of Figs. 1 to 4, inclusive, it will be obvious that the filter strip 25 may be driven in either direction to compensate for changes in light intensity, the plate 26 remaining fixed. While in this instance the amount of travel of the filter strip 25 required to compensate for a given change in light intensity is greater than in the previous forms of the invention, yet the structural arrangement may lend itself better to certain installations than where the two filter strips are arranged to be shifted simultaneously in opposite directions.

What is claimed is:

Means for compensating for changes in the intensity of available light admitted to a light-sensitive surface, comprising a single strip of flexible filter material having the characteristics of neutral density and variation in density in proportion to length, a roller at one side of the light path over which said strip is trained, said strip being doubled back upon itself to bring sections in which density variation is in opposite directions in overlapping relation across the light path, means at the opposite side of the light path for maintaining the said sections in predetermined spaced overlapped relation, and means for adjusting the filtering position of the strip.

References Cited in the file of this patent

UNITED STATES PATENTS

| | | |
|---|---|---|
| 2,478,406 | Lamb | Aug. 9, 1949 |
| 2,689,879 | Rehorn | Sept. 21, 1954 |
| 2,728,814 | Berger | Dec. 27, 1955 |

FOREIGN PATENTS

| | | |
|---|---|---|
| 729,259 | Great Britain | May 4, 1955 |
| 936,843 | Germany | Dec. 22, 1955 |